United States Patent
Hermant-Santini (10) Patent No.: US 8,761,516 B2
(45) Date of Patent: Jun. 24, 2014

(54) METHOD AND SYSTEM FOR DETECTING THE OPEN OR CLOSED STATE OF THE EYES OF A FACE

(75) Inventor: Gwladys Hermant-Santini, Paris (FR)

(73) Assignee: ST-Ericsson SA, Plan-les-Ouates (CH)

( * ) Notice: Subject to any disclaimer, the term of this patent is extended or adjusted under 35 U.S.C. 154(b) by 180 days.

(21) Appl. No.: 13/321,596

(22) PCT Filed: May 20, 2010

(86) PCT No.: PCT/EP2010/056948
§ 371 (c)(1),
(2), (4) Date: Feb. 2, 2012

(87) PCT Pub. No.: WO2010/136376
PCT Pub. Date: Dec. 2, 2010

(65) Prior Publication Data
US 2012/0269442 A1      Oct. 25, 2012

(30) Foreign Application Priority Data
May 25, 2009   (FR) ...................................... 09 53422

(51) Int. Cl.
*G06K 9/66*    (2006.01)

(52) U.S. Cl.
USPC ...... 382/195; 340/575; 340/573.1; 348/222.1

(58) Field of Classification Search
CPC .... G06K 9/00597; G06K 9/6202; G06K 9/78
USPC .............. 382/195; 340/575, 573.1; 348/222.1
See application file for complete search history.

(56) References Cited

U.S. PATENT DOCUMENTS

2007/0133884 A1*  6/2007  Hammoud .................... 382/225
2009/0060383 A1*  3/2009  Li et al. ......................... 382/282

OTHER PUBLICATIONS

Fei Wang and Huabiao Qin, "A FPGA based Driver Drowsiness Detecting System", Jun. 2005.*

* cited by examiner

*Primary Examiner* — Mike Rahmjoo
(74) *Attorney, Agent, or Firm* — Patent Portfolio Builders PLLC (57) ABSTRACT

Method of detecting the open or closed state of at least one eye of a face, comprising a detection of an eye of a face and associated system. The method comprises a detection of vertical contours of the eye, and a determination of the open or closed state of the eye on the basis of the vertical contours detected.

28 Claims, 5 Drawing Sheets

METHOD AND SYSTEM FOR DETECTING THE OPEN OR CLOSED STATE OF THE EYES OF A FACE

The invention relates to the field of photographic image capture, and more particularly to the detection of an open or closed state of the eyes of a face appearing on a photographic image when taking a photographic image.

When capturing a photographic image, it may happen that a photographed subject closes their eyes at the moment that the image is captured. This happens unexpectedly when the photographic image is captured at the moment that the subject blinks their eyes naturally, or else because they close their eyes by reflex following the generation of the flash by the photographic apparatus.

The photographic image thus captured is generally considered by the photographer to be wasted, and must often be retaken.

Systems for detecting the blinking of the eyes are integrated into various digital photographic apparatus. By virtue of these systems, the photographer is informed that his photograph comprises closed eyes, by virtue of an item of information displayed on the LCD screen for example. This information encourages him to retake a photograph in such a way that nobody has their eyes closed in the photograph. In a manner which is transparent to the user but with the option to "detect the blinking of the eyes" activated by the user, the system could also delay the taking of the photographic image captured so that the eyes are open.

The known solutions for detecting eye blinking generally require large computational capacity for a processor. These solutions are not applicable in the case of a digital photographic apparatus of a mobile telephone apparatus, the computational capacity of the processor of which is reduced. Indeed, for a digital photographic apparatus of a mobile telephone apparatus, the solution has to be amongst the simplest possible, given the limitation of the accessible memory and the accessible processor power.

It is thus proposed in one mode of implementation to alleviate the abovementioned drawbacks by detecting the contour of the eyes and more particularly by using the number of vertical contours detected.

According to one aspect, there is proposed a method of detecting the open or closed state of at least one eye of a face, comprising a detection of an eye of a face.

According to a general characteristic of this aspect, the method then comprises a detection of vertical contours of the eye, and a determination of the open or closed state on the basis of the vertical contours detected.

The inventor has indeed observed that an open eye comprises more vertical contours than a closed eye. Indeed, from the standpoint of a visualization of the contours of an eye, a closed eye could be represented almost just by horizontal contours, whereas an open eye will be represented by horizontal and vertical contours, with for example the vertical contours of the centre of the eye, such as those of the pupil, which may be detected.

The vertical direction along which the vertical contours are defined is defined by the eyes detected, and by the face. For example, the vertical direction may refer to the axis of symmetry of the face to which the detected eye belongs. Thus, if a head appears tilted on a photographic image, the eyes and/or the face will be detected and will therefore define a vertical direction and a horizontal direction. It is also possible to define the vertical direction on the basis of the detection of a face and at least one eye. Thus, if a photographic image of a face in profile is captured, thus showing only one eye, it is possible to apply the detection of the open or closed state of an eye to the eye thus detected.

Advantageously, the detection of an eye of a face may comprise a definition of a work window comprising the detected eye, a determination of a first number of pixels belonging to the vertical contours in the work window, and the determination of the open or closed state of the eye may comprise a comparison of the first number of pixels with a threshold value.

The definition of a work window makes it possible, on the one hand, to limit the analysis zone and thus to decrease the processing time. It also makes it possible, on the other hand, to define a zone where the vertical contours liable to be detected belong to the contour of the eye and not to a contour of another element of the face.

The detection of an eye of a face may also comprise a definition of a window comprising the detected eye, a determination of a first number of pixels belonging to the vertical contours in the work window, a determination of the height of the work window with a second number of pixels, and the determination of the open or closed state of the eye may comprise a comparison of the ratio of the first number of pixels to the second number of pixels with a first threshold factor.

The determination of the open or closed state of the eye, thus carried out on the basis of the ratio of the first number of pixels to the second number of pixels, makes it possible to define a threshold factor circumventing the height of the work window used.

Advantageously, the method can comprise a detection of horizontal contours of the eye and a determination of the open or closed state of the eye on the basis of the horizontal and vertical contours detected.

The method can advantageously comprise a definition of a window comprising the detected eye, a determination of a first number of pixels belonging to the vertical contours in the work window, a determination of a third number of pixels belonging to the horizontal contours, and the determination of the open or closed state may comprise a comparison of the ratio of the first number of pixels to the third number of pixels with a second threshold factor.

The determination of the open or closed state of the eye, thus carried out on the basis of the ratio of the first number of pixels to the third number of pixels, makes it possible, on the one hand, to define a threshold factor circumventing the size of the work window used, and, on the other hand, to circumvent any parasitic detection of vertical or horizontal contours.

Indeed, the ratio thus calculated is very different depending on the open or closed state of the eyes. The discrepancy, thus known, between the ratios of the two states makes it possible to fix a value for the second threshold factor making it possible to circumvent any parasitic detection that may give rise to an error, while retaining a precise detection of the open or closed state of the eye.

Preferably, the detection of horizontal contours of the eye may comprise a determination of a gradient of luminous intensity of pixels along the vertical direction.

A pixel is detected as belonging to a horizontal contour when, along a vertical direction, the luminous intensity gradient of a pixel is greater than a vertical intensity gradient threshold. A variation in luminous intensity greater than a certain threshold may indeed convey the presence of a contour.

Likewise, the detection of vertical contours of the eye may comprise a determination of a gradient of luminous intensity of pixels along a horizontal direction.

Said horizontal direction is preferentially orthogonal to said vertical direction.

A pixel is detected as belonging to a vertical contour when, along a horizontal direction, the luminous intensity gradient of a pixel is greater than a horizontal intensity gradient threshold. A variation in luminous intensity greater than a certain threshold may indeed convey the presence of a contour.

In a general manner, the values of the various thresholds, threshold factors, luminous intensity gradient thresholds mentioned hereinabove depend in particular on the optical and digital characteristics of the digital photographic apparatus used. The person skilled in the art will be able to adjust the value of these thresholds as a function of these characteristics and of the application envisaged.

According to another aspect, there is proposed a device for detecting the open or closed state of at least one eye of a face, comprising means for detecting an eye of a face which are able to determine the location of an eye of a face.

The device comprises means for detecting vertical contours of an eye which are able to define vertical contours of the eye, and means for determining the open or closed state which are able to determine whether the detected eye is open or closed on the basis of the vertical contours detected.

The means for detecting an eye of a face may advantageously comprise a module for defining a work window able to define a work window comprising the detected eye, and the means for determining the open or closed state of the eye may comprise a comparison module able to compare a first number of pixels belonging to the vertical contours detected in the work window with a threshold value.

Advantageously, the means for detecting an eye of a face may also comprise a module for defining a work window able to define a work window comprising the detected eye, and the means for determining the open or closed state of the eye may comprise a first module for comparing factors able to compare a ratio of a first number of pixels belonging to the vertical contours detected in the work window to a second number of pixels defining the height of the work window with a first threshold factor.

Preferably, the device may also comprise furthermore means for detecting horizontal contours of the eye which are able to define the horizontal contours of the eye, and the means for determining the open or closed state of the eye may be configured so as to determine the state of the eye on the basis of the vertical and horizontal contours detected.

The means for detecting an eye of a face may advantageously comprise a module for defining a work window able to define a work window comprising the detected eye, and the means for determining the open or closed state of the eye may comprise a second module for comparing factors able to compare with a second threshold factor the ratio of a first number of pixels belonging to the vertical contours detected in the work window to a third number of pixels belonging to the horizontal contours detected in the work window.

Preferably, the means for detecting the horizontal contours of an eye may comprise a module for determining a vertical luminous intensity gradient able to determine a luminous intensity gradient of a pixel in a horizontal direction.

Likewise, the means for detecting the vertical contours of an eye may comprise a module for determining a horizontal luminous intensity gradient able to determine a luminous intensity gradient of a pixel in a horizontal direction of the plane.

According to another aspect, there is proposed a digital photographic apparatus comprising a device for detecting the open or closed state of at least one eye of a face.

According to another aspect, there is proposed a mobile telephone apparatus comprising a digital photographic apparatus comprising a device for the open or closed state of at least one eye of a face.

Other advantages and characteristics of the invention will become apparent on examining the wholly non-limiting detailed description of the embodiments and modes of implementation, and the appended drawings in which.

Figure 1:
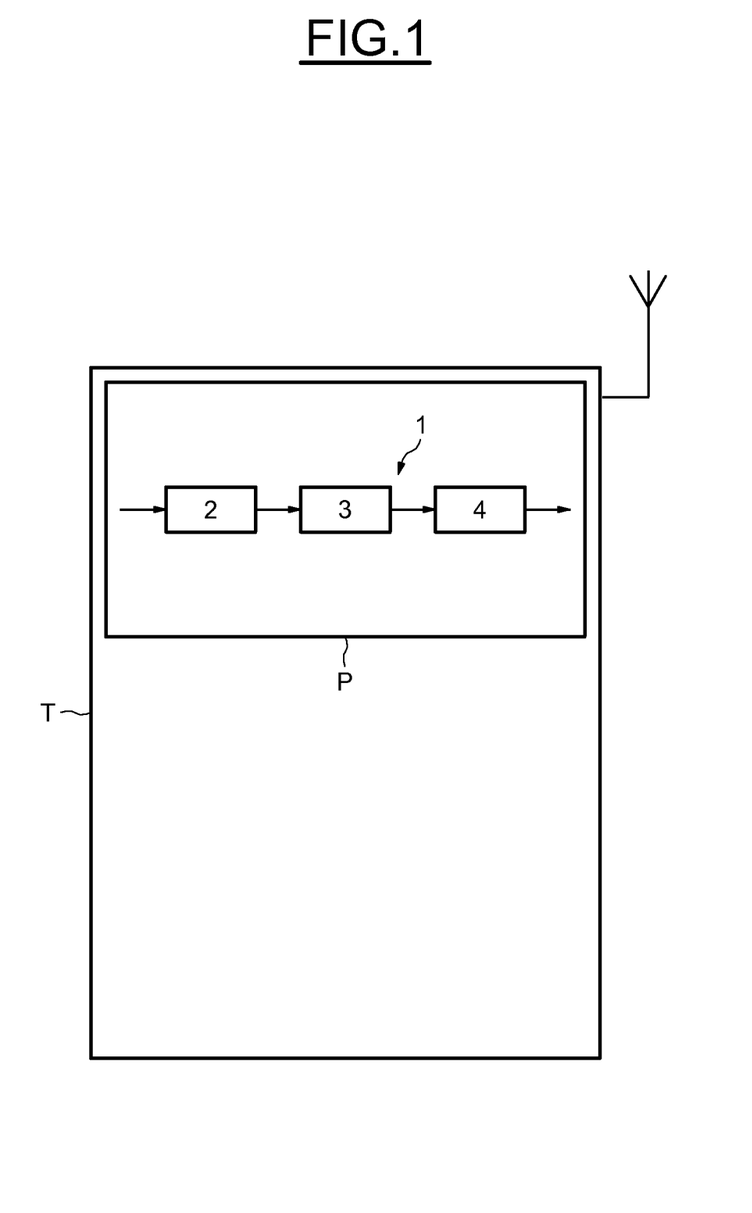
FIG. 1 represents, in a schematic manner, an embodiment of a mobile telephone apparatus comprising a digital photographic apparatus comprising a device for detecting the open or closed state of at least one eye of a face.

In FIG. 1 is represented a mobile telephone apparatus T comprising a digital photographic apparatus P. The digital photographic apparatus P comprises a device 1 for detecting the open or closed state of at least one eye of a face.

The detection device 1 comprises means 2 for detecting an eye of a face which are able to determine the location of the eye, means 3 for detecting the pixels representative of vertical contours of an eye which are able to chart the vertical contours of the eye, and means 4 for determining the open or closed state of the eye which are able to determine whether the eye detected is open or closed.

Figure 2:
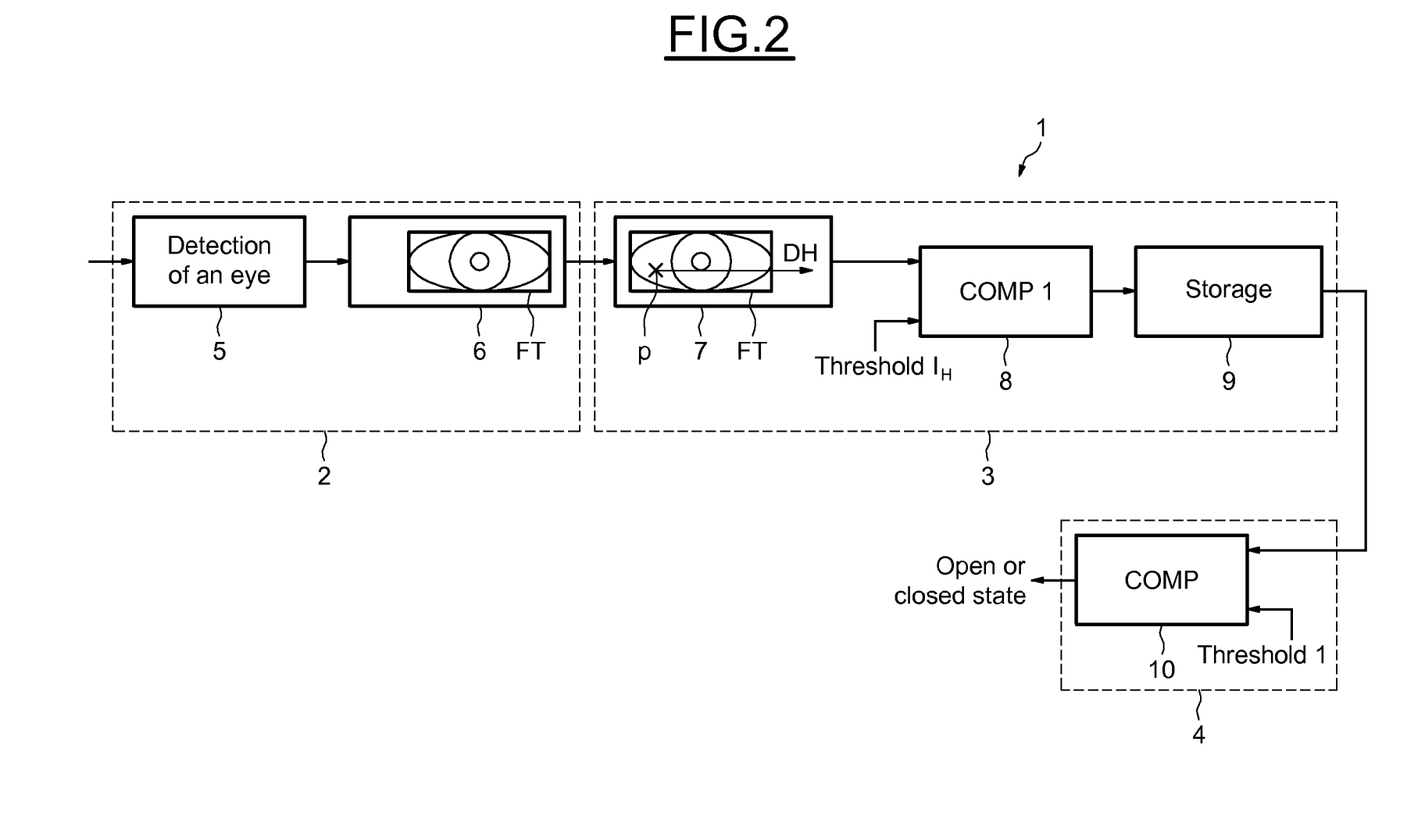
FIG. 2 illustrates, in a schematic manner, a device for detecting the open or closed state of at least one eye of a face according to a first embodiment.

In FIG. 2 a device 1 for detecting the open or closed state of at least one eye of a face is represented in further detail. In this embodiment, the means 2 for detecting the eye comprise a module 5 for detecting the eye and a module 6 for defining a work window.

The module 5 for detecting an eye makes it possible to detect each eye present on each face present on the photographic image recorded at the moment of visualization by the digital photographic apparatus P. The module 5 for detecting an eye detects the zones corresponding to the eyes with the aid, for example, of the variation in luminance both on the vertical plane and on the horizontal plane of the photographic image, once the faces have been detected.

Means for detecting an eye such as the module 5 are well known per se to the person skilled in the art. More precisely, and by way of indication, the detection module 5 implements software procedures known per se and for example described in the articles "Driver Fatigue Detection Based on eye Tracking and Dynamic Template Matching" and "Real-time pupil detection based on three-step hierarchy" published in the IEEE journal.

On the basis of the co-ordinates of each eye detected on the photograph, the module 6 defines for each eye detected a work window FT comprising the eye detected.

The module 6 then outputs the work window FT for each of the eyes detected on the visualization image to the detection means 3.

The means 3 for detecting the pixels representative of vertical contours of an eye comprise a module 7 for measuring the horizontal intensity gradient able to measure the luminous intensity gradient of a pixel along the horizontal direction of the plane, a first comparison module 8 and a memory 9.

The module 7 makes it possible to measure the intensity gradient of a given pixel p in the work window FT defined by the module 6 by observing the variation in luminous intensity in a horizontal direction DH for said pixel.

Once the horizontal intensity gradient has been measured for a pixel, it is output to the comparison module 8 which then compares the horizontal intensity gradient received for this given pixel with a horizontal intensity gradient threshold $I_H$. This threshold $I_H$ of horizontal intensity gradient makes it possible to define whether the pixel corresponds to a pixel representative of a vertical contour. If the horizontal intensity gradient is greater than the threshold $I_H$, then the pixel is considered to belong to a vertical contour. Otherwise, it is not considered to belong to a vertical contour.

The value of the threshold $I_H$ depends on the optical and digital characteristics of the digital photographic apparatus used, but it may lie between 15 and 25, if the intensity gradient is calculated as the difference of luminance in absolute value between the two pixels adjacent to the pixel considered and if the luminance of a pixel is coded between 0 and 255.

The information arising from the first comparison module 8 is then stored in the memory 9. The information obtained about the gradient of each pixel is delivered to the means 4 for determining the open or closed state of a detected eye.

The means 4 for determining the open or closed state of the eye comprise a comparison module 10 able to compare the number of pixels representative of vertical contours detected in the work window with a threshold value (threshold 1). Thus, if the number N1 of pixels representative of vertical contours detected in a work window is greater than the threshold value (threshold 1), the detected eye is considered to be open.

The comparison module 10 may be embodied with the aid of a software module or by comparison logic circuits.

Additionally, the value of the threshold depends on the characteristics of the digital photographic apparatus. This threshold value may be non-zero so as to avoid parasitic detections of pixels detected as belonging to vertical contours of the eye although they do not. The detection threshold fixed by this value may be relatively low depending on the characteristics, but, by way of indication, this value could, for example, be of the order of 5% of the number of pixels lying in the work window.

Figure 3:
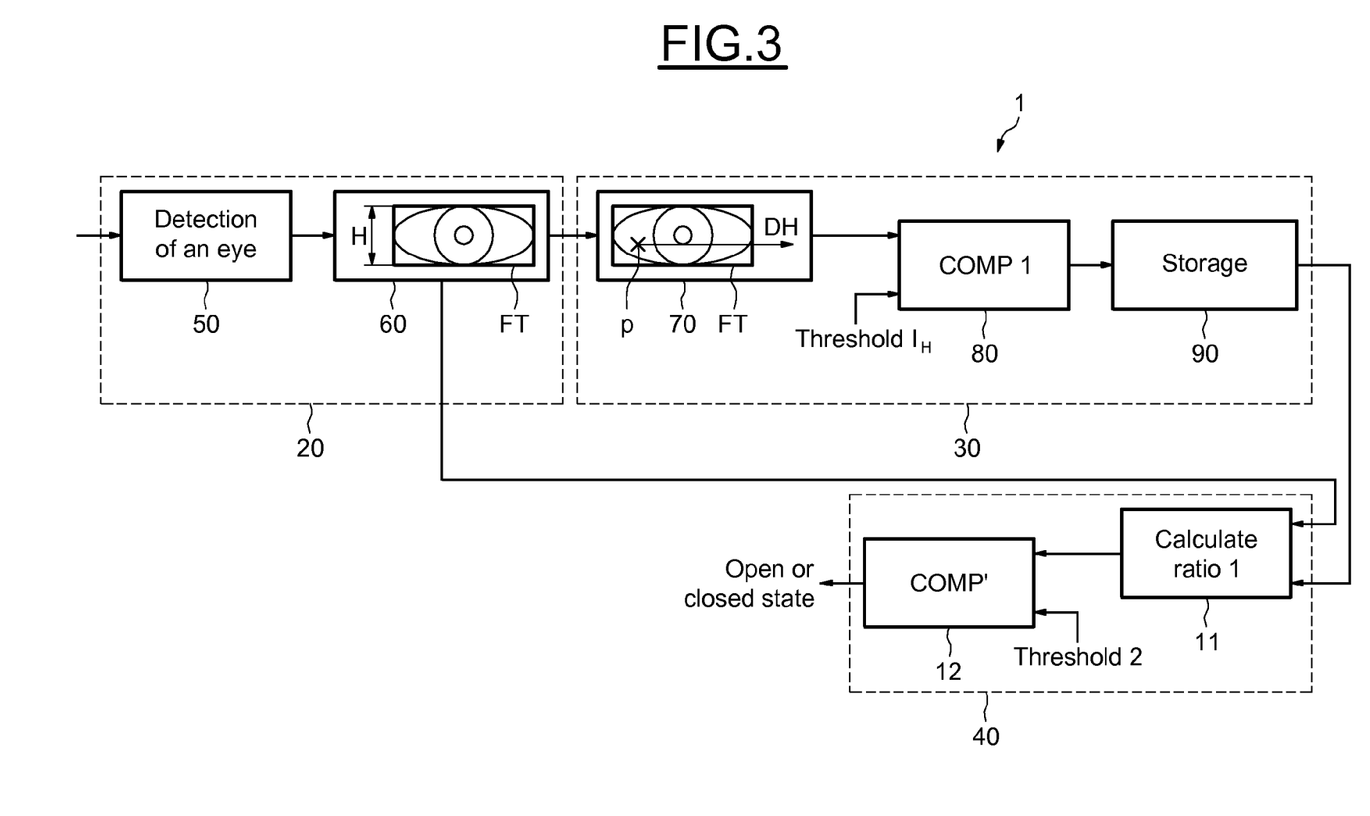
FIG. 3 illustrates, in a schematic manner, a device for detecting the open or closed state of at least one eye of a face according to a second embodiment.

In FIG. 3 is represented a device 1 for detecting the open or closed state of at least one eye of a face according to a second embodiment. In this figure, the elements which are identical or have identical functions to those illustrated in FIG. 2 have references multiplied by ten with respect to those which they had in FIG. 2. Only the differences between the two figures will be described. In this embodiment the means 60 for defining a work window output the height H of the work window FT in terms of number of pixels to the means 40 for determining the open or closed state of the detected eye. These means 40 comprise a module 11 for calculating the ratio of the number N1 of pixels representative of vertical contours detected in the work window FT to the number N2 of pixels defining the height H of the work window FT.

The ratio N1/N2 thus calculated is output by the module 11 to a module 12 for comparing factors. This module 12 then compares the ratio N1/N2 with a first threshold factor (threshold 2). Thus, if the ratio N1/N2 is greater than a first threshold factor (threshold 2), the detected eye is considered to be open.

The module 12 can be embodied with the aid of a software module or by comparison logic circuits.

Additionally, the value of the first threshold factor may be relatively low depending on the characteristics, but this value could, by way of indication, lie, for example, between 1 and 2.

Figure 4:
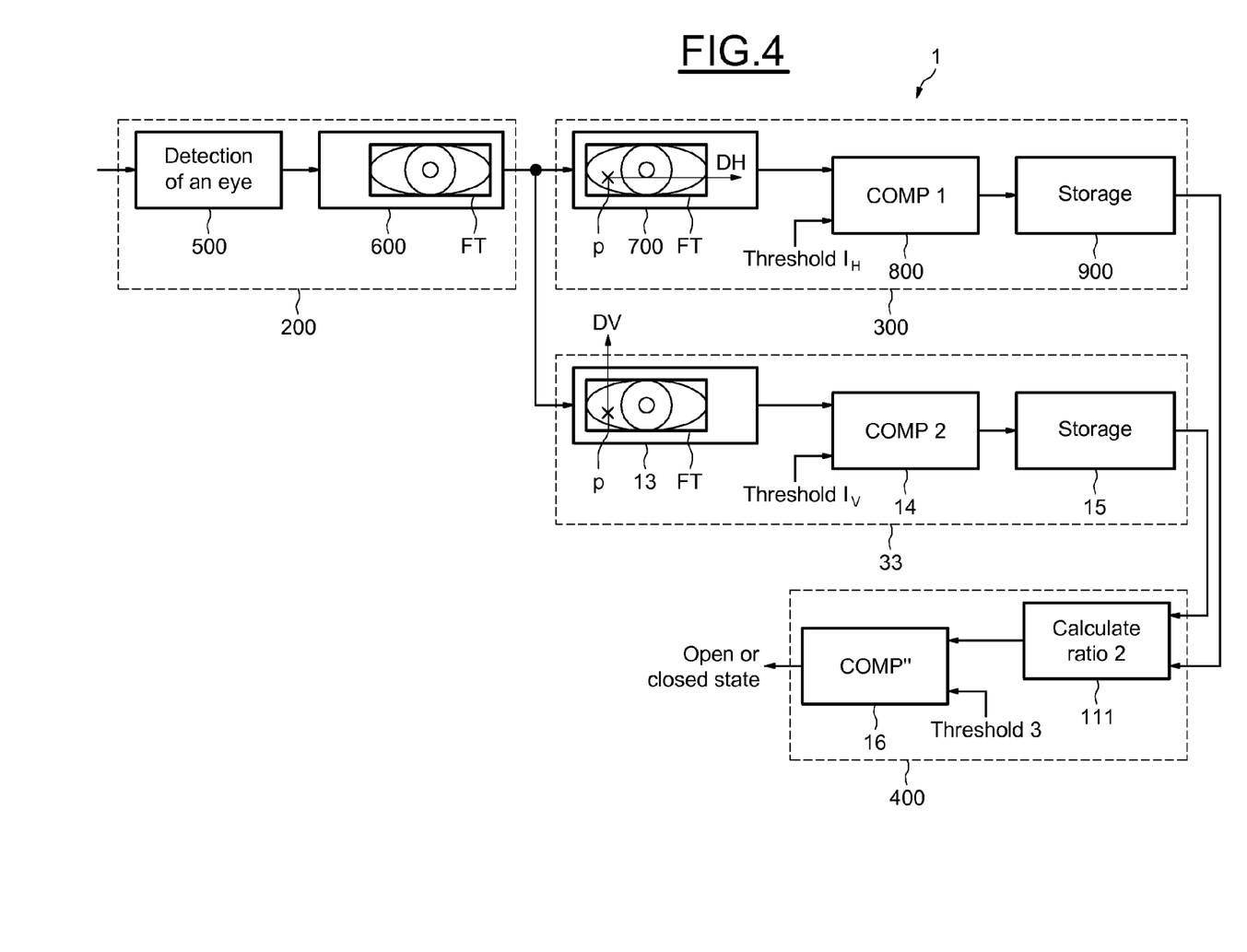
FIG. 4 illustrates, in a schematic manner, a device for detecting the open or closed state of at least one eye of a face according to a third embodiment.

In FIG. 4 is represented a device 1 for detecting the open or closed state of at least one eye of a face according to a third embodiment. In this figure, the elements which are identical or have identical functions to those illustrated in FIG. 2 have references multiplied by one hundred with respect to those which they had in FIG. 2. Only the differences between the two figures will be described.

In this embodiment the means 600 also output the work window FT for each of the eyes detected on the visualization image to means 33 for detecting the pixels representative of horizontal contours of the eye.

The means 33 comprise a module 13 for measuring the vertical intensity gradient able to measure the luminous intensity gradient of a pixel p along the vertical direction DV, a comparison module 14 and a memory 15.

The module 13 makes it possible to measure the intensity gradient of a given pixel in the work window FT by observing the variation in luminous intensity in the vertical direction for said pixel.

Once the vertical intensity gradient has been measured for a pixel, it is output to the comparison module 14 which then compares the vertical intensity gradient received with a vertical intensity gradient threshold $I_V$. This threshold $I_V$ of vertical intensity gradient makes it possible to define whether the pixel corresponds to a pixel representative of horizontal contours. If the vertical intensity gradient is greater than the threshold $I_V$, then the pixel is considered to belong to a horizontal contour. Otherwise, it is not considered to belong to a horizontal contour.

The value of the threshold $I_V$ depends on the optical and digital characteristics of the digital photographic apparatus used, but it may, for example, lie between 15 and 25, if the intensity gradient is calculated as the difference of luminance in absolute value between the two pixels adjacent to the pixel considered and if the luminance of a pixel is coded between 0 and 255.

The information arising from the comparison module 14 is then stored in the memory 15 and is delivered to the means 400 for determining the open or closed state of a detected eye.

The means 400 therefore receive as input the number N1 of pixels representative of vertical contours detected in the work window FT, as well as the number N3 of pixels representative of horizontal contours detected in the work window FT. The means 400 comprise, in this embodiment, a module 111 for calculating the ratio of the number N1 to the number N3, and a second module 16 for comparing factors.

The ratio N1/N3 calculated by the module 111 is output to the second module 16 for comparing factors. This module 16 for comparing factors then compares the calculated ratio N1/N3 with a second threshold factor (threshold 3). Thus, if the ratio N1/N3 is greater than the second threshold factor (threshold 3), the eye detected is considered to be open.

The module 16 can be embodied with the aid of a software module or by comparison logic circuits.

Additionally, the value of the second threshold factor depends on the characteristics of the digital photographic apparatus. The value of the second threshold factor may be, for example, of the order of 1/2.

Figure 5:
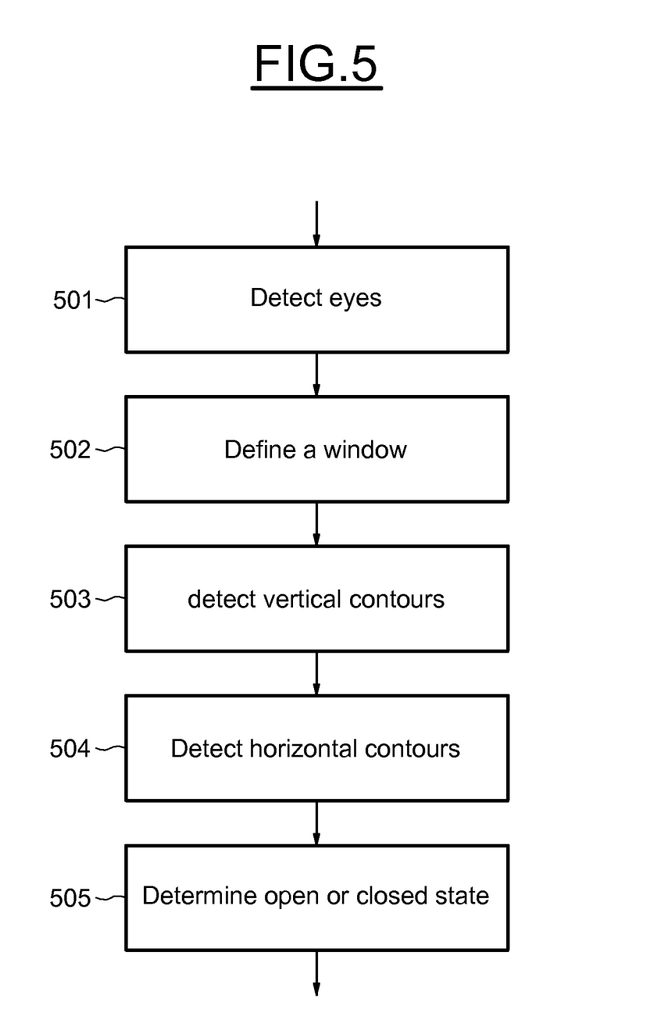
FIG. 5 represents an overview of a mode of implementation of a method of detecting the open or closed state of at least one eye of a face.

In FIG. 5 is represented an exemplary overview of a method of detecting the open or closed state of at least one eye of a face according to one mode of implementation.

In this mode of implementation, a detection of the eyes is firstly carried out in a first step 501. In a subsequent step 502, a work window is defined for each eye detected in the previous step. Each work window encompasses a detected eye.

In a subsequent step 503, a detection of the pixels representative of the vertical contours is carried out for each eye detected. Thus, in each work window FT, all the pixels contained in the work window FT are analysed so as to determine the pixels representative of vertical contours. To do this, the luminosity gradient of each pixel is determined in a horizontal direction of the plane of the image. If the gradient of the pixel is greater than a horizontal gradient threshold, the pixel is considered to be representative of a vertical contour.

In a subsequent step 504, a detection of the pixels representative of the horizontal contours is carried out for each eye detected. Thus, in each work window FT, all the pixels contained in the work window FT are analysed so as to determine the pixels representative of horizontal contours. To do this, the luminosity gradient of each pixel is determined in a vertical direction of the plane of the image. If the gradient of the pixel is greater than a vertical gradient threshold, the pixel is considered to be representative of a horizontal contour.

Finally, in a last step 505, the open or closed state of each eye detected is determined on the basis of the ratio of the number of pixels representative of vertical contours detected in a work window FT to the number of pixels representative of horizontal contours detected in the same work window FT. If the ratio thus calculated is greater than a second threshold factor, the eye is considered to be open.

The invention claimed is:

1. A method of detecting the open or closed state of at least one eye of a face, comprising:
    detecting an eye of a face with an eye detection means, wherein said detecting includes
        detecting vertical contours of the eye with a vertical contour pixel detection means; and
        determining an open or closed state of the eye with means for determining an open or closed state of the eye at least on the basis of the vertical contours detected,
    further wherein the detection of an eye of a face comprises:
    defining a work window with a work window defining module, wherein said work window includes the detected eye,
    determining a first number of pixels belonging to the vertical contours in the work window with a module for measuring a horizontal luminosity gradient, and
    determining a height of the work window with a second number of pixels with a means for defining a height of a work window, and wherein the determination of the open or closed state of the eye includes
        comparing a ratio of the first number of pixels to the second number of pixels with a first threshold factor.

2. The method according to claim 1, further wherein the determination of the open or closed state of the eye includes comparing the first number of pixels with a threshold value.

3. The method according to claim 1, further comprising:
    detecting horizontal contours of the eye with a module for detecting pixels representative of horizontal contours; and
    determining an open or closed state of the eye on the basis of the horizontal and vertical contours detected.

4. The method according to claim 3, in which the detection of an eye of a face comprises:
    determining a third number of pixels belonging to the horizontal contours in the work window with a module for measuring a vertical luminosity gradient, wherein the determination of the open or closed state of the eye includes
        comparing a ratio of the first number of pixels to the third number of pixels with a second threshold factor.

5. The method according to claim 3, in which the detection of the horizontal contours of the eye comprises:
    determining a gradient of luminous intensity of pixels along a vertical direction with a module for measuring a vertical luminosity gradient.

6. The method according to claim 1, in which the detection of the vertical contours of the eye comprises:
    determining a gradient of luminous intensity of pixels along a horizontal direction with a module for measuring a horizontal intensity gradient.

7. A device for detecting the open or closed state of at least one eye of a face, comprising:
    means for detecting an eye of a face to determine the location of an eye of a face, wherein said means for detecting an eye includes
        means for detecting vertical contours of an eye configured to chart the vertical contours of the eye, and
        means for determining the open or closed state of the eye configured to determine whether the detected eye is open or closed at least on the basis of the vertical contours detected,
    further wherein the means for detecting an eye of a face comprises:
    a module for defining a work window configured to define a work window comprising the detected eye, and wherein
    the means for determining the open or closed state of the eye includes
        a first module for comparing factors configured to compare a ratio of a first number of pixels representative of vertical contours detected in the work window to a number of pixels defining the height of the work window with a first threshold factor.

8. The device according to claim 7, wherein the means for determining the open or closed state of the eye includes
    a second comparison module configured to compare a first number of pixels belonging to the vertical contours in the work window with a threshold value.

9. The device according to claim 7, further comprising:
    means for detecting horizontal contours of an eye configured to chart the horizontal contours of the eye, and wherein
    the means for determining the open or closed state of the eye are configured so as to determine the state of the eye on the basis of the vertical and horizontal contours detected.

10. The device according to claim 9, wherein the means for detecting an eye of a face comprises:
    a module for defining a work window configured to define a work window comprising the detected eye, and wherein
    the means for determining the open or closed state of the eye includes
        a second module for comparing factors configured to compare with a second threshold factor a ratio of a number of pixels representative of vertical contours detected in the work window to a number of pixels representative of horizontal contours detected in the work window.

11. The device according to claim 9, wherein the means for detecting the horizontal contours of an eye comprises:
    a second module for determining a vertical luminous intensity gradient configured to determine the luminous intensity gradient of a pixel along a vertical direction.

12. The device according to claim 7, wherein the means for detecting the vertical contours of an eye comprises:
   a second module for determining a horizontal luminous intensity gradient configured to determine the luminous intensity gradient of a pixel along a horizontal direction.

13. A digital photographic apparatus, comprising:
   a device for detecting the open or closed state of at least one eye of a face according to claim 7.

14. A mobile telephone apparatus, comprising:
   a digital photographic apparatus according to claim 13.

15. A method of detecting the open or closed state of at least one eye of a face, comprising:
   detecting an eye of a face with an eye detection means, wherein said detecting includes
      detecting vertical contours of the eye with a vertical contour pixel detection means;
      determining an open or closed state of the eye with means for determining an open or closed state of the eye at least on the basis of the vertical contours detected;
   defining a work window with a window defining module wherein said work window includes the detected eye; and
   determining a first number of pixels belonging to the vertical contours in the work window with a module for measuring a horizontal luminosity gradient, wherein the determination of the open or closed state of the eye takes into account the number of pixels belonging to vertical contours detected inside said work window.

16. The method according to claim 15, wherein the determination of the open or closed state of the eye includes
   comparing the first number of pixels with a threshold value using a comparator.

17. The method according to claim 15, in which the detection of an eye of a face comprises:
   determining a height of the work window with a second number of pixels with a means for defining a height of a work window, and wherein the determination of the open or closed state of the eye includes
      comparing a ratio of the first number of pixels to the second number of pixels with a first threshold factor in a comparator.

18. The method according to claim 15, further comprising:
   detecting horizontal contours of the eye with a module for detecting pixels representative of horizontal contours;
   determining a third number of pixels belonging to the horizontal contours in the work window with a module for measuring a vertical luminosity gradient, wherein the determination of the open or closed state of the eye includes
      comparing a ratio of the first number of pixels to the third number of pixels with a second threshold factor using a comparator.

19. The method according to claim 18, in which the detection of the horizontal contours of the eye comprises:
   determining a gradient of luminous intensity of pixels along a vertical direction with a module for measuring a vertical luminosity gradient.

20. The method according to claim 15, in which the detection of the vertical contours of the eye comprises:
   determining a gradient of luminous intensity of pixels along a horizontal direction with a module for measuring a horizontal intensity gradient.

21. A device for detecting the open or closed state of at least one eye of a face, comprising:
   a module for defining a work window configured to define a work window comprising the detected eye;
   means for detecting an eye of a face to determine the location of an eye of a face, wherein said means for detecting an eye includes
      means for detecting vertical contours of an eye configured to chart the vertical contours of the eye, and
      means for determining the open or closed state of the eye configured to determine whether the detected eye is open or closed at least on the basis of the vertical contours detected;
   means for defining a work window with a window defining module wherein said work window includes the detected eye; and
   means for determining a first number of pixels belonging to the vertical contours in the work window with a module for measuring a horizontal luminosity gradient, wherein the determination of the open or closed state of the eye takes into account the number of pixels belonging to vertical contours detected inside said work window.

22. The device according to claim 21, wherein the means for determining the open or closed state of the eye includes
   a comparison module configured to compare a first number of pixels belonging to the vertical contours in the work window with a threshold value.

23. The device according to claim 21, wherein
   the means for determining the open or closed state of the eye includes
      a first module for comparing factors configured to compare a ratio of a first number of pixels representative of vertical contours detected in the work window to a number of pixels defining the height of the work window with a first threshold factor.

24. The device according to claim 21, further comprising:
   means for detecting horizontal contours of an eye configured to chart the horizontal contours of the eye, and wherein
   the means for determining the open or closed state of the eye includes
      a second module for comparing factors configured to compare with a second threshold factor a ratio of a number of pixels representative of vertical contours detected in the work window to a number of pixels representative of horizontal contours detected in the work window.

25. The device according to claim 24, wherein the means for detecting the horizontal contours of an eye comprises:
   a module for determining the vertical luminous intensity gradient configured to determine the luminous intensity gradient of a pixel along a vertical direction.

26. The device according to claim 21, wherein the means for detecting the vertical contours of an eye comprises:
   a module for determining the horizontal luminous intensity gradient configured to determine the luminous intensity gradient of a pixel along a horizontal direction.

27. A digital photographic apparatus, comprising:
   a device for detecting the open or closed state of at least one eye of a face according to claim 21.

28. A mobile telephone apparatus, comprising:
   a digital photographic apparatus according to claim 27.

* * * * *